United States Patent
Pulkkinen et al.

(10) Patent No.: US 6,954,439 B2
(45) Date of Patent: Oct. 11, 2005

(54) SYNCHRONIZATION OF TERMINALS IN A RADIO LINK SYSTEM

(75) Inventors: Otto Pulkkinen, Helsinki (FI); Jarmo Mäkinen, Espoo (FI); Lauri Kuru, Espoo (FI)

(73) Assignee: Nokia Corporation, Espoo (FI)

( * ) Notice: Subject to any disclaimer, the term of this patent is extended or adjusted under 35 U.S.C. 154(b) by 907 days.

(21) Appl. No.: 09/817,886

(22) Filed: Mar. 26, 2001

(65) Prior Publication Data

US 2001/0014083 A1 Aug. 16, 2001

Related U.S. Application Data

(63) Continuation of application No. PCT/FI99/00845, filed on Oct. 11, 1999.

(30) Foreign Application Priority Data

Oct. 23, 1998 (FI) .................................................. 982296

(51) Int. Cl.[7] .............................. H04J 3/00; H04J 3/06
(52) U.S. Cl. ...................................... 370/280; 370/350
(58) Field of Search ................................ 370/280, 350, 370/347, 294, 503, 507, 508; 455/561

(56) References Cited

U.S. PATENT DOCUMENTS

| | | | |
|---|---|---|---|
| 4,646,291 A | | 2/1987 | Perntz et al. |
| 5,272,694 A | | 12/1993 | Bourgart et al. |
| 5,285,443 A | * | 2/1994 | Patsiokas et al. ........... 370/280 |
| 5,293,380 A | * | 3/1994 | Kondo ........................ 370/350 |
| 5,347,562 A | * | 9/1994 | Candy ........................ 370/280 |
| 5,448,570 A | | 9/1995 | Toda et al. |
| 5,473,668 A | * | 12/1995 | Nakahara ..................... 370/347 |
| 5,758,287 A | | 5/1998 | Lee et al. |
| 5,898,685 A | * | 4/1999 | Schnizlein ................... 370/350 |
| 6,094,421 A | * | 7/2000 | Scott ........................... 370/280 |
| 6,480,483 B2 | * | 11/2002 | Yahata et al. ............... 370/350 |
| 6,587,444 B1 | * | 7/2003 | Lenzo et al. ................ 370/330 |

FOREIGN PATENT DOCUMENTS

| | | |
|---|---|---|
| DE | 3643834 | 6/1988 |
| EP | 0505281 | 9/1992 |
| JP | 04-25229 | 1/1992 |
| JP | 7046660 | 2/1995 |
| JP | 10145847 | 5/1998 |
| WO | WO 98/58477 | 12/1998 |

OTHER PUBLICATIONS

Japanese Office Action.
International Search Report for PCT/FI99/00845.

* cited by examiner

*Primary Examiner*—Steven Nguyen
(74) *Attorney, Agent, or Firm*—Squire, Sanders & Dempsey LLP

(57) ABSTRACT

The objective of the invention is to increase the potential hop density of single frequency TDD radio links by allowing a set of closely located terminals to use a single channel. This is possible when transmission and reception periods of the terminals are synchronized so that the transmit period of any of the terminals in a terminal group does not overlap with the receive period of any of the terminals in the group. Synchronization is achieved by selecting at least one terminal in a hub site as a super master terminal. This terminal gives timing through a common bus to the rest of the terminals in the group. These terminals use the received timing for adjusting their own timing i.e. for adjusting the starting moment and ending moment of the transmission and reception periods in such a manner that none of terminals is sending a burst while another terminal is receiving.

12 Claims, 6 Drawing Sheets

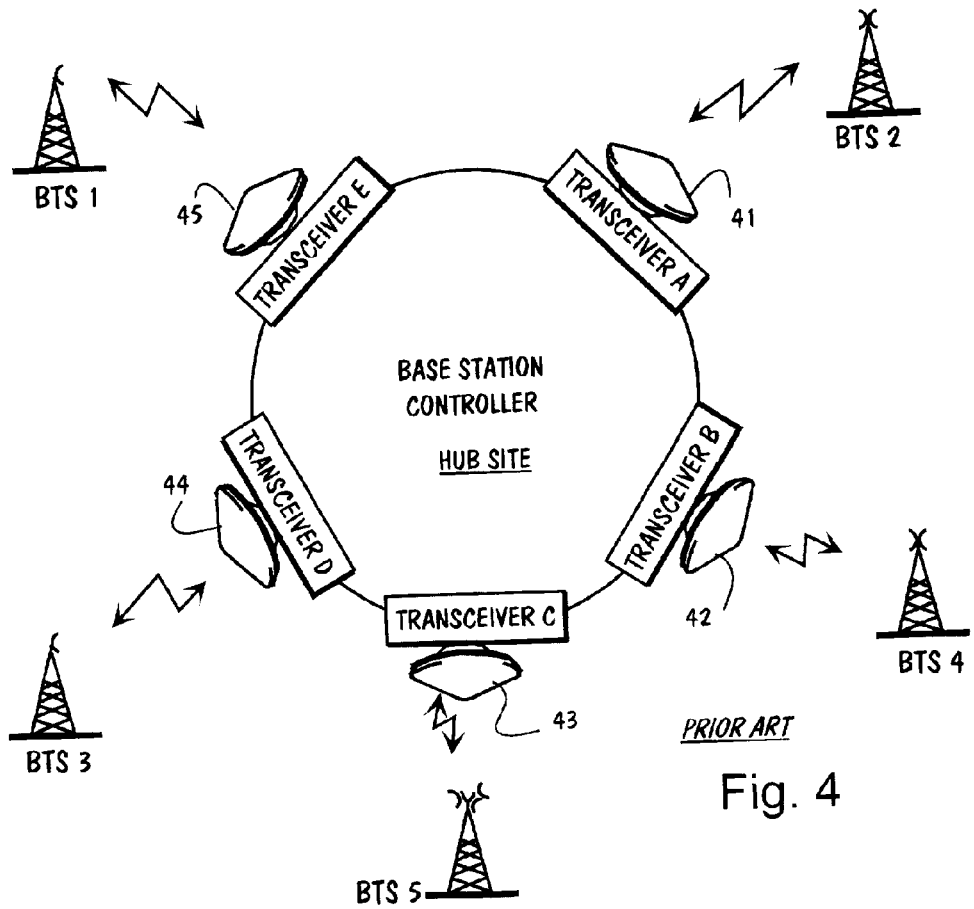
*PRIOR ART*
Fig. 4
Fig. 6A
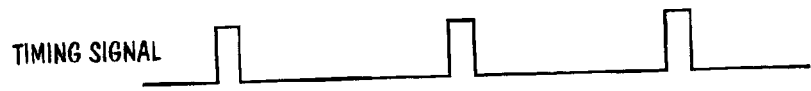
Fig. 6B
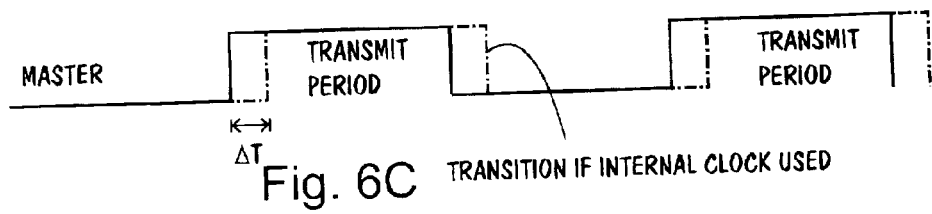
Fig. 6C  TRANSITION IF INTERNAL CLOCK USED

SYNCHRONIZATION OF TERMINALS IN A RADIO LINK SYSTEM

This is a continuation of PCT/FI99/00845 filed on Oct. 11, 1999.

FIELD OF THE INVENTION

The present invention relates to a method of synchronizing transmit periods of terminals in a radio link system operating in time division duplex mode. Particularly, the terminals can share a common single carrier.

BACKGROUND OF THE INVENTION

Modern terrestrial microwave radio systems provide a feasible technical solution for telecommunications transmission links at distances from some hundreds of meters to up to 80 km. Such systems are increasingly being developed in both cellular and fixed telecommunications networks. A radio link system is a particularly good solution in urban areas for wireless based networks in fixed telecommunications, and for base station interconnections and base station—base station controller in cellular communication. Unlike fiber, which can require several months for right-of-way and permits, microwave can be put into immediate operation. In addition, microwave easily goes over difficult terrain where cable cannot be laid, and microwave does not require trenching or pulling through duct work, which can take weeks or months, and which increases installation costs.

A typical microwave radio site consists of an indoor mounted base band unit, an indoor or outdoor mounted radio frequency transceiver, and an parabolic antenna.

Basically there are two types of radio link network topologies in use, namely star networks and ring networks. Of course, it is common for hybrid ring and star network as well as tree network to be deployed.

FIG. 1 depicts an example of a star network. It contains at least one telephone switch and one or more hub sites at strategic locations, which serve spurs or chains of subordinate sites from the centralized hub. The hub sites are connected to the switch via a transmission link, which usually is a trunk cable. A star network has one disadvantage in that outages on a single transmission link may affect many sites so lowering overall network reliability.

FIG. 2 shows a network configured in a ring structure. This structure requires some routing and grooming intelligence at all appropriate points in the network. The capacity of every link in the ring has to be sufficient to support all sites in the loop.

As mentioned above, radio link network provides one solution for realizing a cellular telecommunications network. Then, with reference to FIGS. 1 and 2, the switch might be a mobile switching center, the hub site can be a base station controller and a subordinate site is a base transceiver station. Each of the radio links performs a point-to-point connection.

FIG. 3 depicts a telecommunications system to which a radio link system using the invented method can be applied. The system is a cellular mobile network comprising a mobile switching center with a visitor location register, base station controllers 31 and 32, and several base transceiver stations BTS. The base station controllers 31 and 32 correspond to the hub sites as depicted in FIG. 2. Usually the base stations and their base station controller are interconnected with fixed trunk lines such as coaxial cables. For several reasons coaxial cable connections are not always possible. In this example, the base stations BTS1, . . . , BTS4 are each directly connected to the base station controller 31 with point-to-point radio links, so forming a star type topology whereas the base stations BTS6, . . . , BTS8 are connected to the base station site BTS5 with point-to-point radio links so forming another star. In this concept, the base station site means a single site which serves a plurality of hops from which one hop or link is common, like the radio link between BTS5 site and the base station controller 31. The base station controller 32 controls base stations BTS 9, . . . , BTS 118, which form a subsequent point-to-point chain. Mobile stations MS in a cell communicate with the network through the base station of that cell so that there is a radio connection between the MS and the BTS. The MS in cell 4 communicates with BTS 4.

One hop carrier between the base station and the base station controller can transfer four 2 Mbits channels each of them being divided into 16 kbits channels. Thus, one 2 Mbits channel can transfer 128 calls. Typical hop length is only 500 meters in the case the network is of the micro cell type.

A message, be it audio, video, or data is modulated on the microwave signal, which is often referred to as a carrier. The maximum distance between sites, also called a hop distance, is mainly determined by propagation characteristics of electromagnetic waves. The higher the carrier frequency the greater free space loss, or attenuation due to the atmosphere, i.e. the shorter the achievable distances. However, this also means that frequency re-use distances are shorter: the distance between links operating on the same frequency can be shorter without fear of interference.

There are three types of interference which should be considered in any terrestrial radio link network: 1) intrasystem interference occurs when a radio signal within a multi-hop network interferes with the receiver of a different hop, 2) external disturbance occurs when a foreign system affects a signal, 3) reflection—from anything that has a reflective surface can deflect other signals into the path of the transmitted signal and the stronger signal will interfere with the weaker signal.

Radio links have traditionally operated on regulated frequency bands which are further divided into frequency channels. The use of radio channels is regulated by local authorities and based on coordinated planning. Hence, in a predetermined local area in which radio links are to be established, only a predetermined overall bandwidth and then a predetermined number of channels are available for the radio links.

When a plurality of radio links or so-called hops are present within a given area, in the regulated radio environment, the channel choice is based on coordinated frequency planning. That is, the channel to be used for a specific radio link at a time is predetermined.

The objective of frequency planning is to assign frequencies to the radio links in order to avoid interference. Prior to the planning, it is essential to determine, at the earliest opportunity, what band are locally available for fixed link systems, and what the local "link policy" is. The majority of national frequency management administrations have some form of link policy regarding link lengths and net output power.

Recent developments in telecommunications have, however, lead to changes with regard to frequency allocations and have thus created possibilities to operate radio links and/or hops in non-coordinated frequency bands. These specific bands are left unregulated in the sense that selection of a working channel for an individual radio terminal inside the band is not controlled by the local authorities. Instead, the channel can be selected freely as long as the general requirements associated with the band are not violated.

As an example, European Telecommunication Standard ETS 300408 specifies the minimum performance parameters for radio equipment operating at frequencies around 58 GHz and not requiring coordinated frequency planning. Recently, the frequency band has been widened by ETSI to cover the band from 57 GHz to 58 GHz. Hence, it is possible to obtain 20 channels with the channel separation of 100 MHz. Within this band it is of interest to share the bandwidth among different links efficiently.

However, unlike the above described traditional radio links within a regulated (or coordinated) radio environment, those systems operating in an non-coordinated band will operate in an interference limited environment. That is, the signal quality of received signals may be deteriorated due to interference phenomena caused by neighboring radio links. Therefore, it is of increasing interest to consider how to share available bandwidths among various systems efficiently.

The most common way to avoid interference is to use different frequencies in the hops located near each other and reuse the frequencies at a distance. Hence, a great majority of the terrestrial radio link systems are based on the frequency division duplex (FDD) concept in which hops having a common site i.e. the hub site, are using different frequencies. Referring to FIG. 3, the channels between the base station controller 31 acting as a hub site and each of the base stations BTS 1, . . . , BTS4 could have a different frequency, for example. A duplex channel is formed from a frequency pair, one frequency of which is used for transmission and another one is used for reception. However, in FDD systems the same channel may be used by a hop pair in a hub site if the aerials are radiating to opposite directions.

A plurality of hops can use the same frequency if the system is based on a time division duplex mode of operation (TDD). In that case terminals in the hub site are transmitting only during predetermined transmit periods which are called time slots. The carrier frequency of each of the transmitters in the hub is the same but each of the transmitters has its own transmit time slot. Consequently, the interfering signal generated by the terminal varies greatly.

FIG. 4 illustrates a simplified block diagram of a hub site including several transceivers. In this example, the number of transceivers is the same as that of the base stations which communicate with the base station controller 31, see FIG. 3. In consequence, the hub site contains a transceiver A for communication with the BTS1 through an aerial 41, a transceiver B for communication with the BTS2 through an aerial 42, a transceiver C for communication with the BTS3 through an aerial 43, a transceiver D for communication with the BTS4 through an aerial 44 and a transceiver E for communication with the BTS5 through an aerial 45. Each transceiver is connected to its own aerial which in turn is aligned with the aerial at the opposite end of the link.

A straightforward implementation of the TDD principle in the radio link system would to allow each transceiver in a hub to use its own timing. This could be done if each hop uses a frequency which differs from frequencies of another hops. In that case, a transmission signal from a transmitter in the hub does not interfere with reception in the receiver of a neighboring transceiver due to the different frequencies.

However, a problem would arise if all the hops in a hub were using the same frequency. The reason for that is clearly comprehensible from FIG. 4. If the beams of aerials 41 and 42 were directed into substantially different directions, aerial 41 could send a signal at a frequency while aerial 42 were simultaneously receiving a signal at the same frequency. On account of divergent antenna beams radiation energy from aerial 41 would not significantly leak to aerial 43. Hence, interference at aerial 42 caused by aerial 41 would be negligible. However, in practice it is very likely that co-channel interference is too high so preventing usage of the same frequency.

The situation is remarkable worse if the aerials are facing in the same direction. Then radiating power from the sending aerial could leak to the receiving aerial causing high interference there. Therefore, due to its very high signal strength, the received interference signal could either saturate the receiver or even damage it. In case each terminal in a hub site uses its own burst rate and timing in transmission, the probability that one terminal is transmitting at the same time another terminal is receiving is very high.

The problem mentioned above leads to the fact that the interfering signal generated by a terminal is greatly varying with time. The hop density of radio links operating in a time division duplex mode in a frequency band, especially in the non-coordinated 58 GHz band, is limited not only by interference caused by the remote links, but also by considerable interference caused by the terminals located in the same hub site.

SUMMARY OF THE INVENTION

The objective of the present invention is to increase the potential hop density of single frequency TDD radio links by allowing a set of closely located terminals to use a single channel. This is possible when transmission and reception periods of the terminals are synchronized so that the transmit period of any of the terminals in a terminal group does not overlap with the receive period of any of the terminals in the group. The terminal group can contain all the terminals in the hub or a part of them. Synchronization prevents the direct interference from a transmitting radio to a receiving radio in the same hub. Synchronization by the invention effectively removes the mutual co-channel interference of terminals. Thus, the terminals are potentially able to use the same transmission channel, which in turn increases maximum hop density in a given geographic area.

Synchronization is achieved by selecting one terminal in a hub site as a super master terminal. This terminal gives timing to the rest of the terminals in the hub. These terminals use the received timing signal as a reference signal for adjusting their own timing i.e. for adjusting the starting moment and ending moment of the transmission and reception periods in such a manner that no terminal is sending a burst while one terminal is receiving.

The rest of the terminals give, in turn, timing to the terminals which are located at the opposite end of the hop. For that reason they are named as master terminals. Hence, a hub contains one super master terminal and one or more master terminals. Both the super master terminal and the master terminals are connected to the common bus. Via this synchronization bus the master terminals receive the timing signal sent by the super master terminal.

According to one embodiment of the invention, the super master terminal also sends through the synchronization bus information about the channel number which shall be used by the master terminals, in addition to the timing signal,. This information can be used during commissioning of the other terminals in the hub. The other terminals have to use this channel with the exception of when some external interference from the direction of their aerials makes this channel unusable.

BRIEF DESCRIPTION OF THE DRAWINGS

The invention is described more closely with reference to the accompanying drawings, in which:

FIG. 4 shows a hub site with transceivers;

FIG. 6A shows transmit and receive periods of the super master;

FIG. 6B shows a timing signal from the super master;

FIG. 6C shows transmit and receive periods of the master;

DETAILED DESCRIPTION OF THE PREFERRED EMBODIMENT

Figure 1:
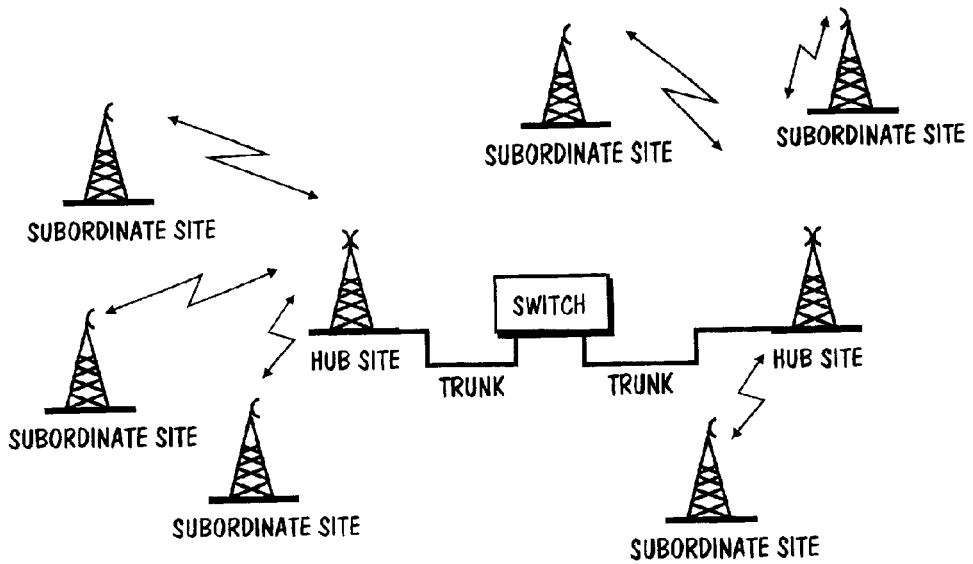
FIG. 1 depicts an example of a radio link network of the star type.
Figure 2:
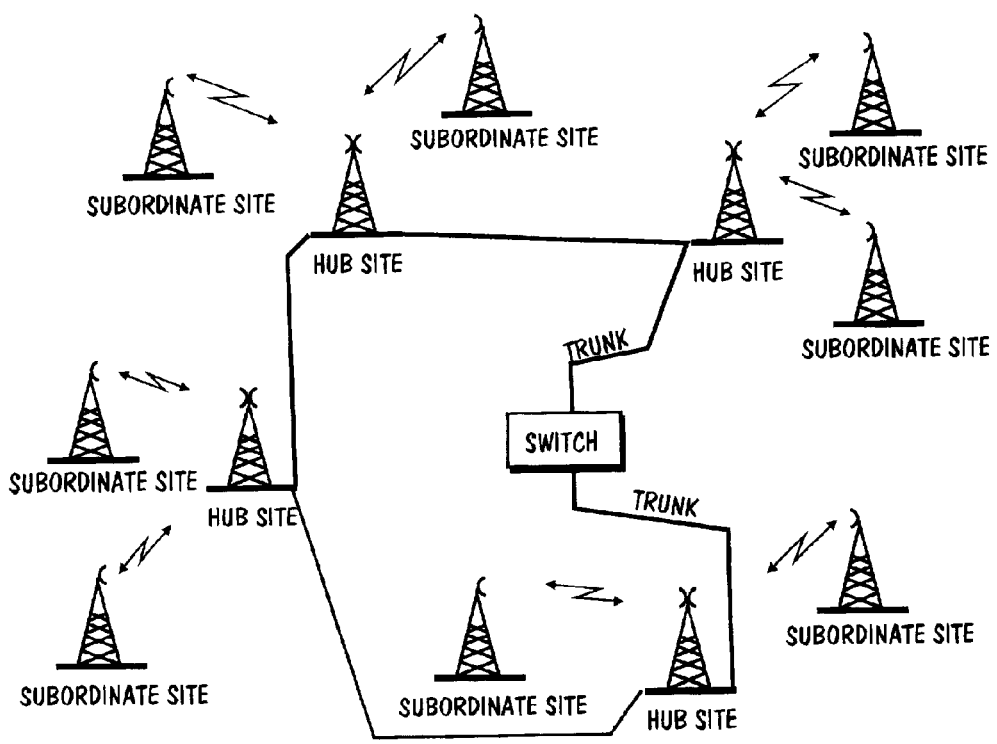
FIG. 2 shows a link network configured in a ring structure.
Figure 3:
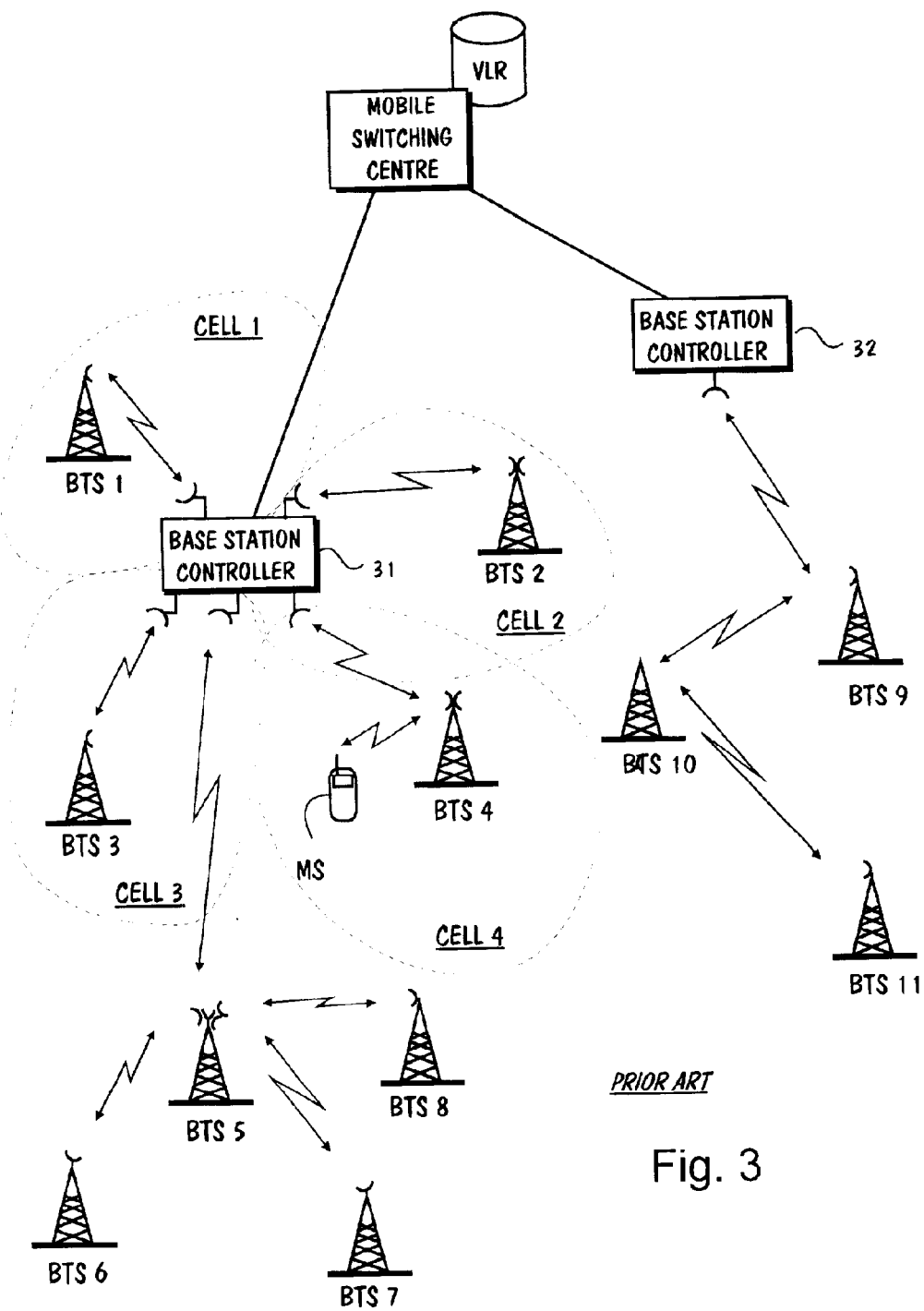
FIG. 3 illustrates a cellular network using radio links.
Figure 5:
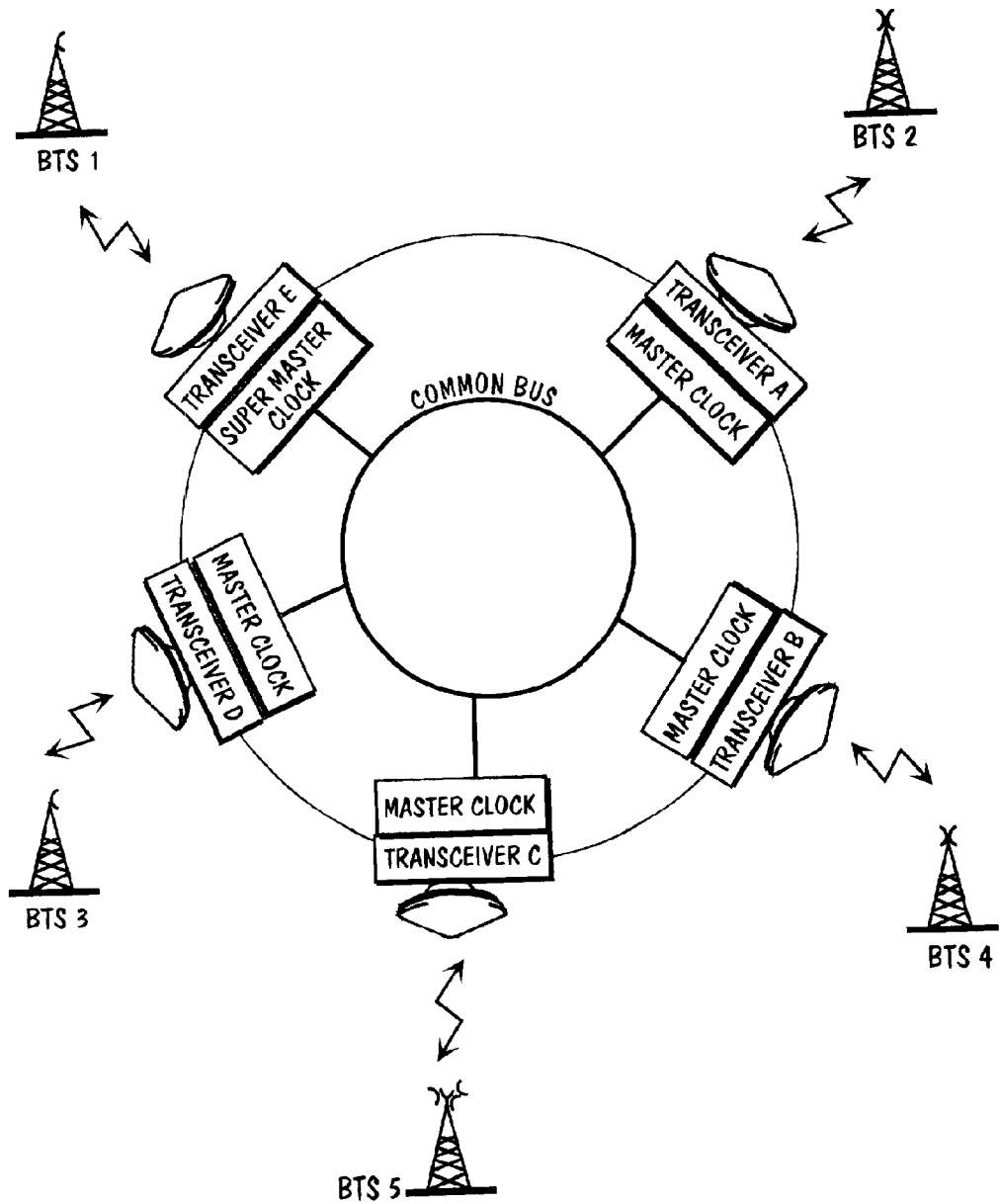
FIG. 5 illustrates a hub site in accordance with the invention.

FIG. 5 corresponds with FIG. 4 but shows additional elements according to the invention. As known in the state of the art, each terminal is provided with a clock circuit which gives timing for the transceiver. The clock circuit is based on an internal oscillator. Normally each transceiver follows its own timing being independent from the timings of other transceivers. Now, one of the terminals is chosen to be a super master whereas the rest of the terminals are chosen to be masters. In FIG. 5, the terminal with transceiver E is the super master.

As the name indicates, the super master gives timing not only to its own transceiver but also to the other transceivers. For that purpose, the super master and the masters are connected to a common bus through which they share information.

The Information which the super master sends to the bus could be the clock signal only, but preferably, it also would contain knowledge about transmit and receive periods of the super master. Hence, the timing might contain the starting and ending moments of said periods. In addition, information could also include the number of the channel that the masters have to use. This is very useful in case a new radio link is to be commissioned and one end of that link is located in the hub.

The masters receive information from the bus and the transceivers in the masters adjust their own transmit and receive periods so that the transmit periods do not overlap with the receive period of any of the masters and with that of the transceiver connected to the super master. Moreover, each master also acts as a hop master dictating the TDD burst rate used by the transceiver at the opposite end of the link. In other words, the master terminal is on the one hand a slave to the super master and on the other hand a master to the transceiver at the opposite end of the hop.

Let us assume that a radio link between the base station controller which is the hub site and base station BTS 5 is being commissioned. Then terminal C at the hub site, after it has been set up, receives information from the common bus, whereupon its transceiver automatically turns to the frequency used by the transceiver of the super master terminal and starts to transmit and receive, guided by the super master's timing signal. The master sends a timing and the channel information on the channel it has to use to base station 5 which adjusts its transmission burst rate accordingly.

In normal operation the clocks of the master terminals need not be phase locked with the clock of the super master terminal. This will be explained with reference to FIGS. 6A, 6B, 6C.

FIG. 6A shows alternating transmit and receive periods of the super master terminal. Starting and ending moments of the periods are locked to the internal clock of the super master. In this example, there is no idle periods between transmission and reception. Duration of an idle period depends on the hop length. If the length is longest possible there is no idle period at all. This is by reason of the propagation delay between end points of the link and that's why all the time reserved for transmission of a burst is needed FIG. 6B shows one possible timing signal which the super master send to the common bus. The timing pulse always rises by a change of a period.

FIG. 6C depicts transmit and receive periods of a master terminal. The master has two alternatives to control its own transmission and reception. Firstly, it can use the timing signal obtained from the common bus as a reference signal for a phase locked loop PLL. The PLL then gives the accurate clock signal which is phase locked to the super master's clock. Secondly, it can use its own internal clock, but at the same time taking care that the phase difference between its own clock and the super master's clock is within a predetermined limit. The latter case in illustrated in FIG. 6C. The dotted line shows transmit and receive periods in the case the timing has been bound directly to the internal clock. The phase difference between the timing signal and the internal clock is $\Delta T$ when expressed in time units. Instead of adjusting the internal clock by amount of $\Delta T$ the master adjusts the moments of starting and ending of transmission. However, some time difference, let's say 1 $\mu s$, is still allowed. As a result, transmission and reception periods track corresponding periods of the super master terminal.

If the radio link system includes two adjacent hub sites both provided with several terminals, each hub site contains only one super master terminal the rest of the terminals being masters. Thus, the timing which the super master gives is used not only by the master terminals in the same hub but also a plurality of terminals in hubs at a distance of one hop. In addition, one or more terminals can be slave terminals. This will be explained later on.

Figure 7:
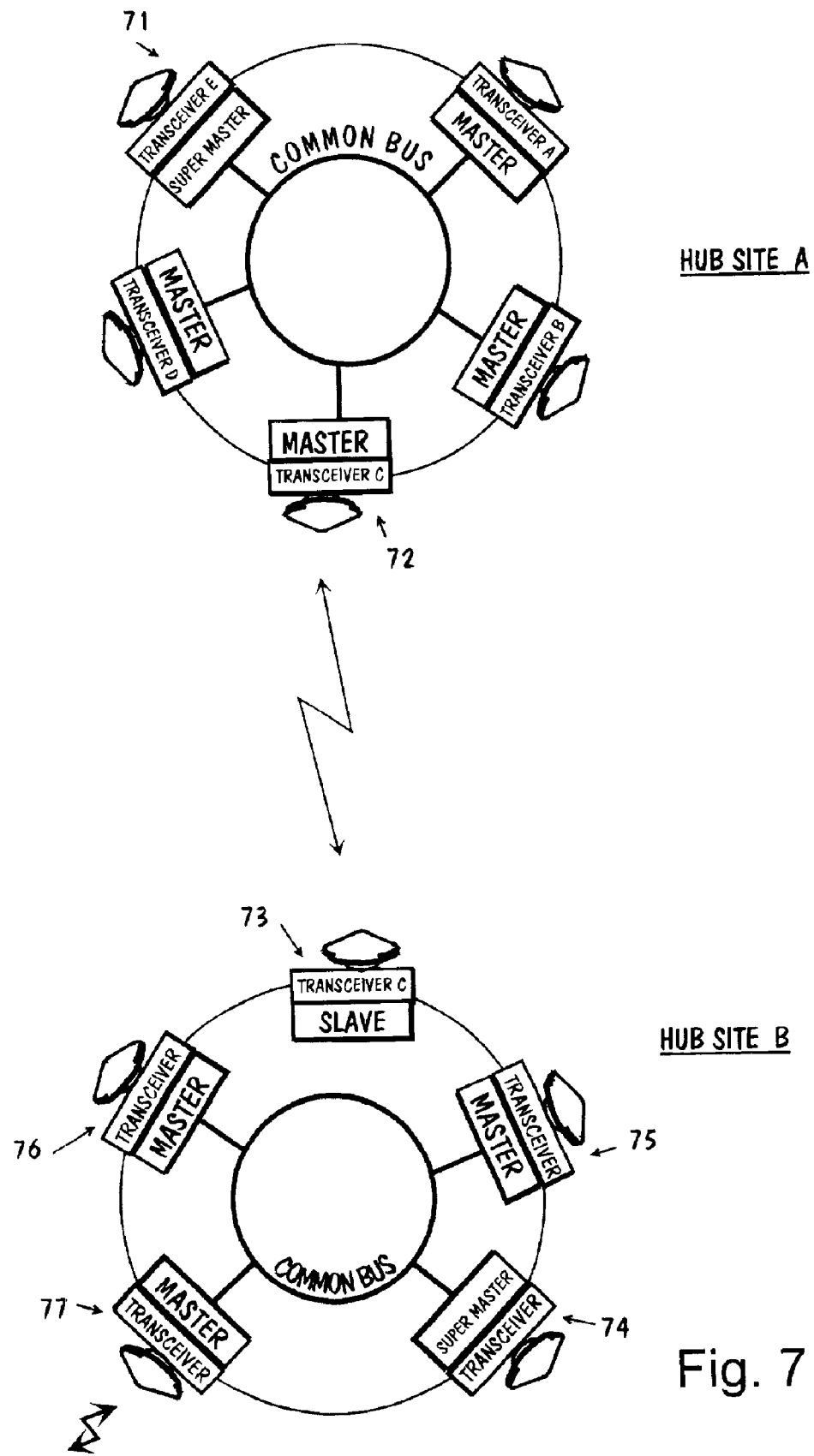
FIG. 7 shows two hub sites.

The meaning of the paragraph above will be clarified with reference to FIG. 7. The hub site A contains five terminals from which one, denoted with reference 71, is the super master. Other terminals including terminal 72 are masters. Another hub site B also contains five terminals. Terminal 74 acts as the super master giving timing to masters 75, 76, 77. Terminal 73 in the hub site B communicates with terminal C in hub site A and that's why their sending and reception periods must be synchronized. This is accomplished so that master terminal C in hub A gives synchronization information the terminal C at the opposite end of the hop. The latter terminal is not connected to the common bus and for that reason it can be called a slave terminal.

All the terminals in the same hub site do not need to share the common bus. Depending on geographical directions of the aerial beams it is, in certain cases, advantageous to form two or more terminal groups from the terminals. Terminals within the same group are connected to the same common bus and one terminal of the group is the super master the rest being masters. In consequence, one hub site can include several super master terminals.

Figure 8:
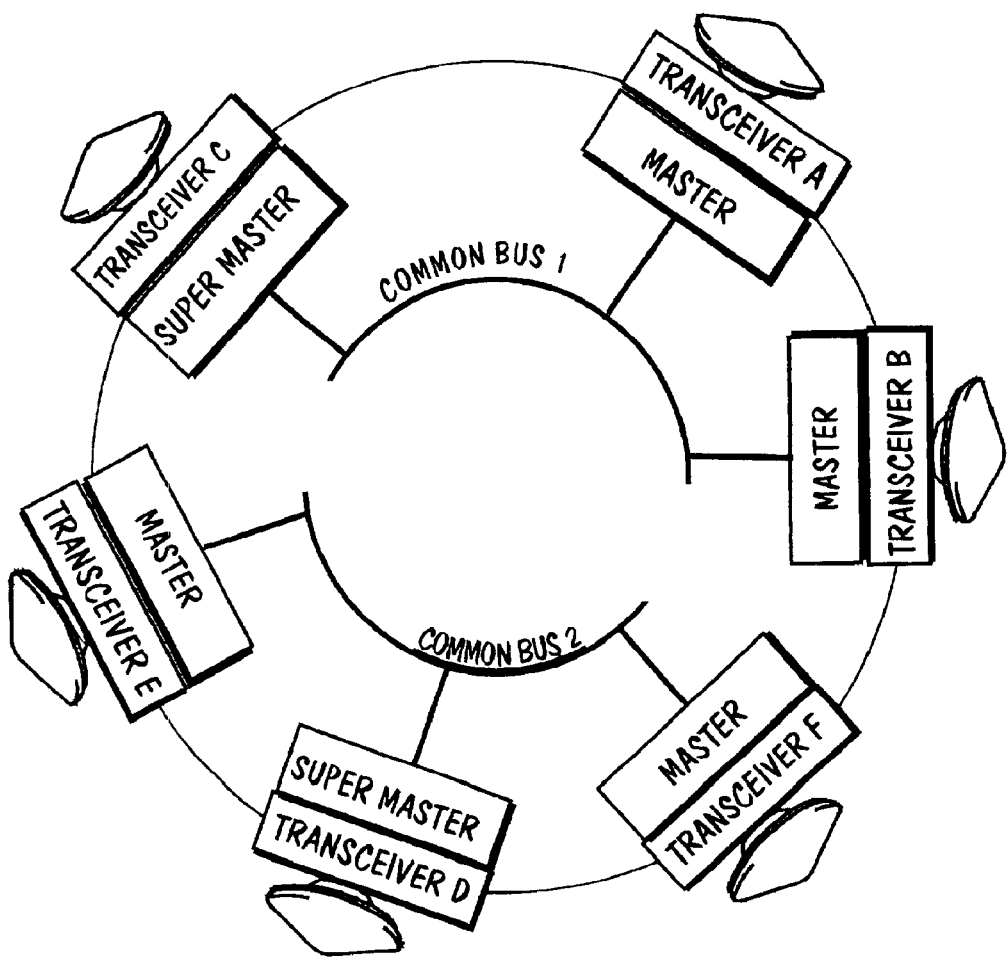
FIG. 8 depicts a hub site with two synchronization buses.

This is explained with reference to FIG. 8. The aerials connected to transceivers A,B,C radiate in directions which are near enough each other to cause high mutual interference if one terminal is sending on a TDD channel while another is receiving on the same channel. On the other hand, the aerials connected to transceivers D,E,F radiate in directions which also might result in high mutual interference but not interfere with the reception of transceivers A,B,C. For that reason a group is formed from terminals A,B and C and they are connected to the common bus 1. One terminal, in FIG. 8 terminal C, is the super master giving timing to the others. A second group is formed from terminals D,E and F and these terminals are connected to another common bus 2. Terminal D acts as the super master.

Despite the number of groups, the selection of the super master terminal among master terminals connected to the same bus can take place either automatically or manually in the commissioning phase of the link hops. The channel number that the super master transmits over the common bus can be used during commissioning of the other terminals connected to the bus. In this case the other terminals will use the same channel expect if some external interference from the direction of their aerials prohibits using this channel. Then a terminal has to use a different TDD channel i.e. the carrier frequency must be changed.

Although the groups of the aerials radiate substantially to the different directions, it is, in practice, very likely that the different directions alone do not guarantee a good signal separation in reception. A signal from a group leaks to a receiver of a adjacent group so causing high interference. For that reason it is recommendable that the frequencies among the groups differ from each other.

One embodiment of the invention is that the super master terminal uses its internal burst phase oscillator to generate a frame containing the channel number. The master terminals connected to the same bus use a phase lock technique to synchronize their burst timing with the super master. The start of the N bit frame is used as a synchronization reference. The bus and its interface implement a wired—or or a wired—and operation. The physical bus medium might be a coaxial cable.

The invention enables the TDD terminals at a hub site to use the same radio channel, thus enhancing spectrum economy. The interference level is limited to the level generated during the receive bursts of the nearby terminals. Even in the case of the same radio channel not being used the invention reduces the danger of blocking the receivers of the other terminals in the hub.

What is claimed is:

1. A method of synchronizing transmission and reception periods of a group of terminals in a fixed radio link system operating in time division duplex mode and in which the group of terminals is located in a hub site, comprising the steps of:
   arranging a common bus;
   choosing one terminal from the group as a super master terminal which sends a synchronization signal to the common bus;
   choosing the rest of the terminals from the group as master terminals which receive the synchronization signal from the common bus;
   timing transmission periods of every individual master terminal in accordance with the synchronization signal received from the common bus in such a manner that the transmission periods overlap neither with reception periods of the master terminals, nor with those of the super master terminal; and
   adding on the synchronization signal information about a radio frequency used by the super master terminal.

2. The method according to claim 1, further comprising:
   sending synchronization information from the master terminal to the a remote terminal at an opposite end of the radio link; and
   timing transmission and reception periods of the remote terminal in accordance with received synchronization.

3. The method according to claim 1, further comprising the step of:
   tuning radio frequency of the transceivers of the master terminals to frequency announced by the super master terminal via the common bus.

4. The method according to claim 1, in which the group of terminals includes all the terminals in the hub site.

5. The method according to claim 1, wherein upon addition of a new terminal in the group, further comprising:
   engaging the new terminal with the common bus;
   receiving the synchronization signal and information about radio frequency from the common bus; and
   carrying out timing and frequency tuning in the new terminal according to the synchronization signal and information about the radio frequency.

6. A The method according to claim 1, wherein upon missing the synchronization signal the common bus, further comprising:
   choosing automatically one of the master terminals as a new super master terminal.

7. A fixed radio link system operating in time division duplex mode comprising:
   at least one hub site including a number of hub transceivers operating at a same radio frequency, the hub site further comprising a common bus to which the hub transceivers are connected, a super master transceiver which is selected from the hub transceivers and which sends a synchronization signal to the common bus, and master terminals which are the rest of the hub transceivers and which receive the synchronization signal from the common bus;
   a number of directive and sectored aerials pointing in different directions, each aerial being connected to a respective transceiver; and
   a plurality of remote stations each having at least one remote transceiver communicating with a predetermined hub transceiver through a radio link,
   wherein every individual master terminal sets the timing of transmission periods in accordance with the synchronization signal received from the common bus in such a manner that the transmission periods overlap neither with reception periods of the other master terminals nor with those of the super master terminal, and
   wherein the super master transceiver sends information about the radio frequency used by the super master transceiver to the common bus.

8. The fixed radio link system according to claim 7, wherein the master terminals send synchronization information to corresponding remote terminals at the opposite ends of the radio links.

9. The fixed radio link system according to claim 8, wherein the remote terminals correct their timings responsive to the received synchronization information.

10. The fixed radio link system according to claim 7, wherein upon addition of a new transceiver to the hub site the new transceiver is configured to:
    engage itself to the common bus for receiving the synchronization signal therefrom; and carry out timing in response to said synchronization signal.

11. The fixed radio link system according to claim 7, wherein in response to disappearance of the synchronization signal from the common bus one of the master transceivers automatically changes into the super master transceiver.

12. The fixed radio link system according to claim 7, wherein the master transceiver turns itself to the radio frequency only when interference caused by external sources is below a predetermined level.

* * * * *